United States Patent
Winterot et al.

(10) Patent No.: US 7,561,339 B2
(45) Date of Patent: *Jul. 14, 2009

(54) OBJECTIVE FOR STEREOMICROSCOPES

(75) Inventors: Johannes Winterot, Jena (DE); Elke Andersson, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 203 days.

This patent is subject to a terminal disclaimer.

(21) Appl. No.: 11/664,556

(22) PCT Filed: Sep. 21, 2005

(86) PCT No.: PCT/EP2005/010195

§ 371 (c)(1),
(2), (4) Date: Apr. 2, 2007

(87) PCT Pub. No.: WO2006/037474

PCT Pub. Date: Apr. 13, 2006

(65) Prior Publication Data

US 2008/0192338 A1    Aug. 14, 2008

(30) Foreign Application Priority Data

Oct. 1, 2004    (DE) .................. 10 2004 048 298

(51) Int. Cl.
*G02B 21/02* (2006.01)

(52) U.S. Cl. .................. 359/656; 359/380; 359/376

(58) Field of Classification Search .............. 359/363, 359/371, 372, 376–380, 656–661
See application file for complete search history.

(56) References Cited

U.S. PATENT DOCUMENTS

| 5,852,515 A | 12/1998 | Kurata |
| 6,226,119 B1 | 5/2001 | Kurata |
| 6,271,971 B1 | 8/2001 | Kurata et al. |
| 2003/0227672 A1* | 12/2003 | Zimmer et al. ............... 359/376 |

FOREIGN PATENT DOCUMENTS

| CH | 449 120 | 12/1967 |
| DE | 102 25 192 | 1/2004 |
| EP | 1 369 729 | 12/2003 |
| JP | 2001-147378 | 5/2001 |
| JP | 2001-221955 | 8/2001 |

OTHER PUBLICATIONS

XP009013507 SPIE vol. 3482, pp. 690-697, Klaus-Peter Zimmer "Optical Designs for Stereomicroscopes".

* cited by examiner

*Primary Examiner*—Joseph Martinez
(74) *Attorney, Agent, or Firm*—Reed Smith LLP

(57) ABSTRACT

The invention is directed to an objective for telescope-type stereomicroscopes with magnification that can be adjusted at post-magnification systems. The objective, which comprises two lens groups LG1 and LG2, satisfies the two conditions $D_{AP} \geq 42$ mm, and $\tan(\omega) \geq 0.16$, where $D_{AP}$ is the diameter of the exit pupil and $\omega$ is the field angle of the objective at the lowest possible magnification setting. When this condition is met, the optical axis of the objective lies midway between the center lines of the two post-magnification systems. In preferred constructions, the total focal length $f'_{objective}$ of the objective is between 40 mm and 160 mm, and the relationship of the focal length $f'_{LG2}$ of the second lens group LG2 to the total focal length $f'_{objective}$ is expressed by $0.1 - 1.8723/f'_{objective} \leq 1/f'_{LG2} \leq 0.2 - 1.8723/f'_{objective}$.

10 Claims, 3 Drawing Sheets

OBJECTIVE FOR STEREOMICROSCOPES

CROSS-REFERENCE TO RELATED APPLICATIONS

This application claims priority of International Application No. PCT/EP2005/010195, filed Sep. 21, 2005 and German Application No. 10 2004 048 298.5, filed Oct. 1, 2004, the complete disclosures of which are hereby incorporated by reference.

BACKGROUND OF THE INVENTION a) Field of the Invention

The invention is directed to an objective for telescope-type stereomicroscopes with magnification that is adjustable at post-magnification systems.

b) Description of the Related Art

In this type of stereomicroscope construction, two separate light bundles are guided through one and the same objective in order to achieve the stereoscopic impression. As a result, the lens diameters of an objective of this kind are significantly larger than those of objectives for monoscopic examination of objects or in Greenough-type stereomicroscopes.

The objectives are generally used in connection with post-magnification systems by which the microscope magnification can be preselected. On the side of the objective remote of the object, the two light bundles enter the post-magnification systems so as to be oriented parallel to one another. The entrance pupils of the two post-magnification systems have a distance B from one another which is defined as the stereo basis. Provided these entrance pupils do not penetrate one another, the following relationships generally apply:

$$D_{AP} \geq B + D_{EP} \quad (1)$$

$$D_{EP} \leq B, \quad (2)$$

where $D_{AP}$ is the diameter of the exit pupils at the objective and $D_{EP}$ is the diameter of the entrance pupils at the post-magnification systems. When the condition for the required magnification is maintained in a stereomicroscope of this constructional type, the diameter of the entrance pupils $D_{EP}$ is made use of to the fullest extent at maximum magnification.

The light coming from different points on the object enters the post-magnification systems at different angles. This angle $\omega$, usually referred to as the field angle, at which the light coming, e.g., from an off-axis point P on the object enters the associated post-magnification system, depends on the selected magnification. The angle $\omega$ has its maximum at the lowest possible magnification setting.

In order to make it possible for customers to use microscopes at magnifications which allow overview imaging of an object as well as detailed viewing without having to change objectives, objectives are required in which there is more space available for suitable post-magnification systems and which further offer a larger usable aperture in the object space. Further, the requirements for objectives have become increasingly demanding with respect to correction of chromatic aberration, image field flattening, and absence of distortion.

U.S. Pat. No. 6,271,971 describes an objective for telescope-type stereomicroscopes with the aim of optimizing the ratio of the required mounting space to the objective focal length.

JP 2001-147378 describes the construction of objectives which are provided for use in telescope-type stereomicroscopes. Considered from the microscope body, they comprise a first lens group with positive refractive power, a second lens group containing at least one cemented triplet, and a third lens group with positive refractive power. The term lens group includes individual lenses, cemented components or combinations thereof.

JP 2001-21955 shows objectives of a different constructional type which are likewise suitable for telescope-type stereomicroscopes. The objectives proposed therein comprise, considered from the microscope body, a first lens group with positive refractive power containing a biconvex cemented component and a second lens group containing at least two cemented components. In this case also, the term lens group includes individual lenses, cemented components and combinations thereof.

In the objectives described in the above-cited publications, correction of the chromatic aberration, field flattening and distortion is successful only conditionally. The demands for more mounting space for the post-magnification systems and larger usable apertures in the object space are also not met with respect to current requirements.

OBJECT AND SUMMARY OF THE INVENTION

Proceeding from this prior art, it is the primary object of the invention to develop an arjective for telescope-type stereomicroscopes which satisfies requirements with respect to correction of the chromatic aberration, field flattening and distortion and meets the demands for more space for the post-magnification systems and for larger usable apertures in the object space to a greater extent than was possible in the prior art.

The object of the invention is met by an objective which satisfies the two following conditions:

$$D_{AP} \geq 42 \text{ mm, and } \tan(\omega) \geq 0.16,$$

where $D_{AP}$ is the diameter of the exit pupil of the objective and $\omega$ is the field angle of the objective at the lowest possible magnification setting. When this condition is met, the optical axis of the objective lies midway between the center lines of the two post-magnification systems.

In a preferred construction, the total focal length $f'_{objective}$ of the objective meets the following condition:

$$40 \text{ mm} \leq f'_{objective} \leq 160 \text{ mm}.$$

In another preferred construction, the objective comprises two lens groups LG1 and LG2, and the relationship of the focal length $f'_{LG2}$ of the second lens group LG2 to the total focal length $f'_{objective}$ is expressed by:

$$0.1 - 1.8723/f'_{objective} \leq 1/f'_{LG2} \leq 0.2 - 1.8723/f'_{objective}.$$

According to the invention, the two lens groups LG1 and LG2, respectively, have a positive refractive power as a whole, wherein the first lens group LG1 comprises a plurality of lenses, at least two of which lenses are cemented together, and the second lens group LG2 comprises a lens with positive refractive power and a meniscus with negative refractive power with a convex curvature toward the object.

The first lens group LG1 lies closer to the object plane than the second lens group LG2.

In a first construction of the objective, the first lens group LG1 comprises five lenses of which (considered from the object plane) the first, third and fourth lenses have positive refractive power, the second and fifth lenses have negative refractive power, and the second and third lenses and fourth and fifth lenses, respectively, are cemented together.

In a second construction, the first lens group LG1 comprises three lenses of which (considered from the object plane) the first and third of which lenses have positive refractive power, the second lens has negative refractive power, and the first and second lenses are cemented together.

In both of the above-mentioned constructions of the objective, the second lens group LG2 (considered from the object plane) comprises an individual lens of positive refractive power and a meniscus of negative refractive power. The meniscus is composed of a lens of positive refractive power and a lens of negative refractive power and has a convex curvature considered from the object. The total refractive power of the lens group LG2 is positive.

The objective according to the invention will be described more fully in the following with reference to two embodiment examples shown in the accompanying drawings.

DESCRIPTION OF THE PREFERRED EMBODIMENTS

Figure 1:
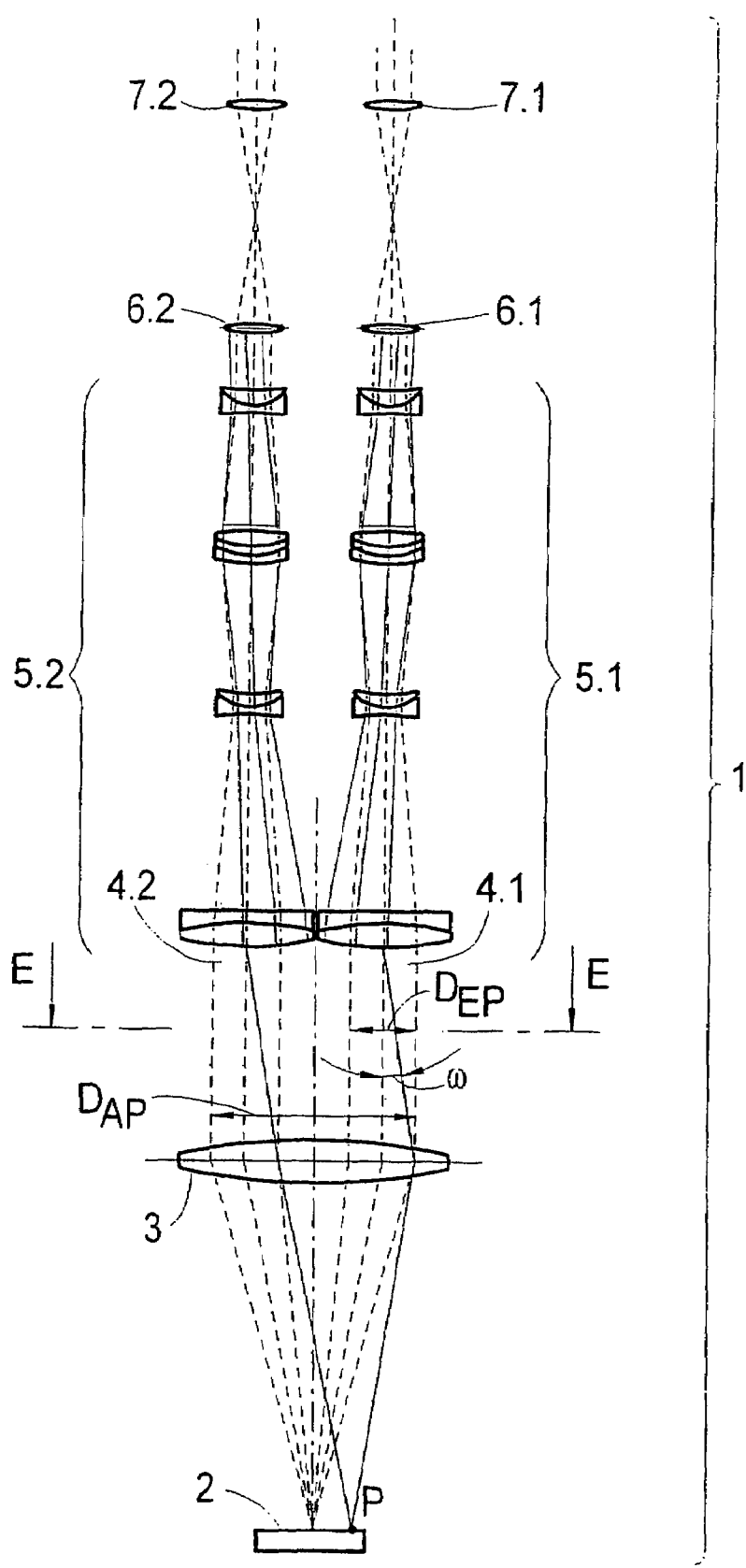
FIG. 1 shows the construction of a telescope-type stereomicroscope known from the prior art in a schematic view for purposes of illustration.

FIG. 1 is a schematic view of a telescope-type stereomicroscope 1 such as is currently used in the art for stereoscopic observation of an object 2.

The stereomicroscope 1 has an objective 3 which collects the light coming from the object 2. The exit pupil of the objective 3 located on the side remote of the object 2 has a diameter $D_{AP}$.

From the exit pupil of the objective 3, the light enters two post-magnification systems constructed in the form of magnification changers 5.1, 5.2 in two light bundles 4.1, 4.2 which are oriented parallel to one another. The magnification changers 5.1, 5.2 enable the user to adjust different magnifications while observing the object 2.

The light coming, for example, from an off-axis point P of the object enters the magnification changers 5.1, 5.2 at an angle ω which varies as the magnification setting changes. The angle ω has its maximum value when the lowest possible magnification is selected.

The entrance pupils of the magnification changers 5.1, 5.2 have, respectively, a diameter $D_{EP}$ which is likewise dependent on the selected magnification. The higher the magnification setting, the larger the diameter $D_{EP}$ of the entrance pupil. It has its maximum value when the maximum magnification is selected.

The magnification changers 5.1, 5.2 are followed in the beam path respectively by a tube lens system 6.1, 6.2 and an eyepiece 7.1, 7.2.

Figure 2:
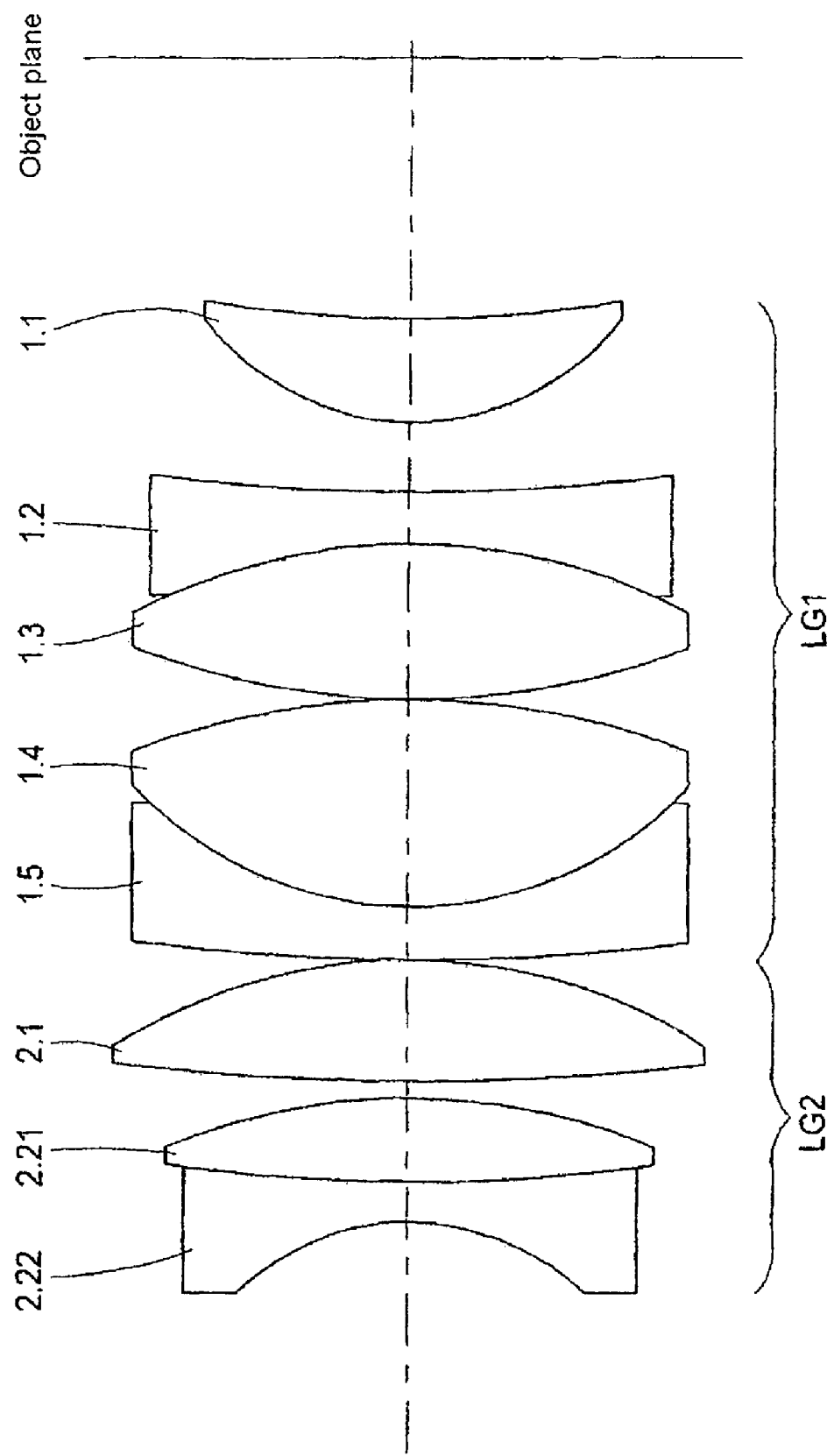
FIG. 2 shows a first constructional variant of the objective according to the invention.

In a first embodiment example of the objective 3 according to the invention which is shown in FIG. 2, a first lens group LG1 and then a second lens group LG2 (viewed in the direction of the image plane from the object plane) are provided. Each lens group LG1 and LG2 has positive refractive power.

In this embodiment example, the first lens group LG1 comprises five lenses of which (seen from the object plane) the first lens 1.1, the third lens 1.3 and the fourth lens 1.4 each have positive refractive power. The second lens 1.2 and fifth lens 1.5 have negative refractive power. The second lens 1.2 and third lens 1.3 are cemented together, and the fourth lens 1.4 and fifth lens 1.5 are cemented together.

As can further be seen from FIG. 2, the second lens group LG2 (considered from the object plane) comprises three lenses 2.1, 2.21, 2.22 of which lenses 2.1 and 2.21 have positive refractive power, while lens 2.22 has negative refractive power. The second lens 2.21 and the third lens 2.22 are cemented together and together form a meniscus of negative refractive power with the convex side facing the object plane.

In the embodiment example according to FIG. 2, the objective 3 according to the invention has a total focal length $f_{objective}=50$ mm and an exit pupil with diameter $D_{AP}=47$ mm and is designed for post-magnification systems in which tan(ω)=0.18 is achieved at the lowest magnification. The following constructional data indicate radii r in mm, thicknesses d in mm, distances a in mm, refractive indices $n_e$ at a wavelength of 546.07 nm, and Abbe numbers $v_e$:

|     |      | r           | d        | a        | $n_e$    | $v_e$  |
|-----|------|-------------|----------|----------|----------|--------|
|     |      |             | Object plane |      |          |        |
|     |      |             |          | 31.99693 |          |        |
| LG1 | 1.1  | −334.94300  | 13.10000 |          | 1.530190 | 76.58  |
|     |      | −39.24230   |          |          |          |        |
|     |      |             |          | 10.50000 |          |        |
|     | 1.2  | −515.78900  | 7.50000  |          | 1.677629 | 32.00  |
|     | 1.3  | 69.28260    | 17.25000 |          | 1.498450 | 81.13  |
|     |      | −81.16600   |          |          |          |        |
|     |      |             |          | 0.15000  |          |        |
|     | 1.4  | 131.46350   | 17.90000 |          | 1.498450 | 81.13  |
|     | 1.5  | −51.95820   | 6.60000  |          | 1.616640 | 44.27  |
|     |      | −386.81700  |          |          |          |        |
|     |      |             |          | 0.15000  |          |        |
| LG2 | 2.1  | 73.91790    | 11.50000 |          | 1.498450 | 81.13  |
|     |      | −294.27300  |          |          |          |        |
|     |      |             |          | 0.92221  |          |        |
|     | 2.21 | 95.03140    | 8.90000  |          | 1.791789 | 25.89  |
|     | 2.22 | −258.51300  | 5.80000  |          | 1.658030 | 39.40  |
|     |      | 39.24230    |          |          |          |        |

Figure 3:
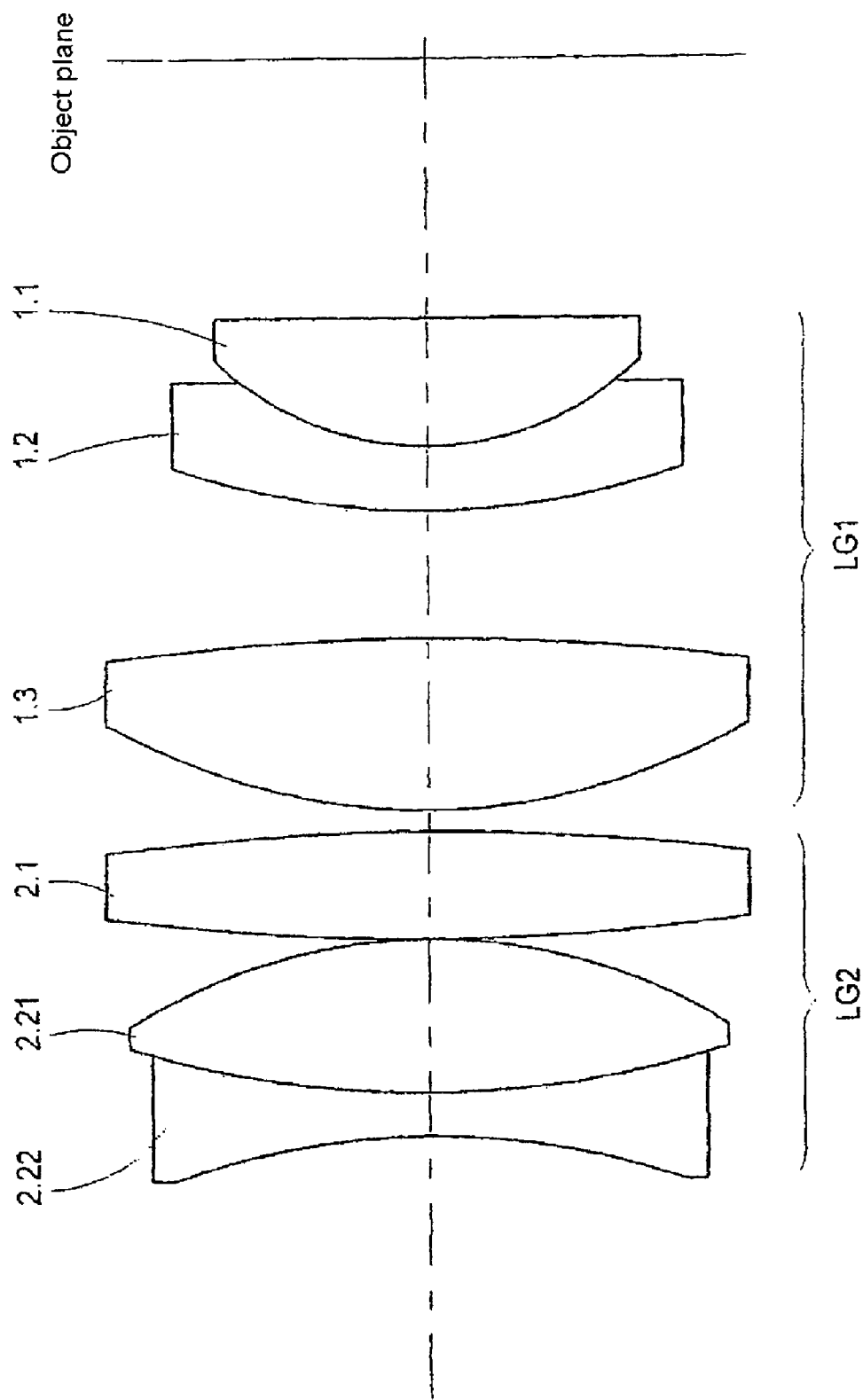
FIG. 3 shows a second constructional variant of the objective according to the invention.

In a second embodiment example of the objective 3 according to the invention shown in FIG. 3, the first lens group LG1 (considered from the object plane) comprises three lenses 1.1, 1.2, 1.3 of which the first lens 1.1 and third lens 1.3 have positive refractive power, the second lens 1.2 has negative refractive power, and the third lens 1.1 and second lens 1.2 are cemented together.

As can further be seen from FIG. 3, the second lens group LG2 (considered from the object plane) comprises, as in the first embodiment example, three lenses 2.1, 2.21, 2.22 of which lenses 2.1 and 2.21 have positive refractive power, while lens 2.22 has negative refractive power. The second lens 2.21 and the third lens 2.22 are cemented together and together form a meniscus of negative refractive power with the convex side toward the object plane.

In this embodiment, the objective 3 according to the invention has a total focal length $f_{objective}=100$ mm and an exit pupil with diameter $D_{AP}=47$ mm and is designed for post-magnification systems in which tan(ω)=0.18 is achieved at the lowest magnification. The following constructional data indicate radii r in mm, thicknesses d in mm, distances a in mm, refractive indices $n_e$ at a wavelength of 546.07 nm, and Abbe numbers $v_e$:

|     |      | r          | d        | a       | $n_e$   | $v_e$  |
|-----|------|------------|----------|---------|---------|--------|
|     |      |            | Object plane |     |         |        |
|     |      |            |          | 61.80600 |        |        |
| LG1 | 1.1  | −258.51300 | 14.46000 |         | 1.487940 | 8.07  |
|     | 1.2  | −30.06750  | 4.00000  |         | 1.616640 | 44.27 |
|     |      | −88.22520  |          |         |         |        |
|     |      |            |          | 8.15800 |         |        |
|     | 1.3  | 344.71300  | 16.06000 |         | 1.530190 | 76.58 |
|     |      | −77.74390  |          |         |         |        |
|     |      |            |          | 0.40000 |         |        |
| LG2 | 2.1  | 244.08300  | 12.00000 |         | 1.668830 | 35.73 |
|     |      | −191.12700 |          |         |         |        |
|     |      |            |          | 0.05000 |         |        |
|     | 2.21 | 71.27670   | 12.00000 |         | 1.487940 | 84.07 |
|     | 2.22 | −107.46370 | 4.00000  |         | 1.616640 | 44.27 |
|     |      | 51.95820   |          |         |         |        |

The exit pupil of the objective 3 has a diameter $D_{AP}$=47 mm in both embodiment examples.

The objective 3 meets the following condition in a particularly advantageous manner in the above-mentioned embodiment examples:

$$0.0003/f'_{objective} \leq \Delta P_{g.F2.1}/(v_{e2.1}*f'_{2.1}) + \Delta P_{g.F2.1}/(v_{e2.1}*f'_{2.21}) + \Delta P_{g.F2.22}/(v_{e2.22}*f'_{2.22}) \leq 0.0003/f'_{objective} + 0.001,$$

where $f'_{objective}$ is the total focal length of the objective 3, $f'_{2.1}$ is the focal length of lens 2.1, $f'_{2.21}$ is the focal length of lens 2.21, $f'_{2.22}$ is the focal length of lens 2.22, $v_{e2.1}$ is the Abbe number of the medium of lens 2.1, $v_{e2.21}$ is the Abbe number of the medium of lens 2.21, $v_{e2.22}$ is the Abbe number of the medium of lens 2.22, $\Delta P_{g.F2.11}$ is the deviation of the medium of lens 2.1 from the normal line, $\Delta P_{g.F2.21}$ is the deviation of the medium of lens 2.21 from the normal line, and $\Delta P_{g.F2.22}$ is the deviation of the medium of lens 2.22 from the normal line.

According to the invention, the deviation from the normal line is used specifically for color correction. Glasses in which the partial dispersion deviates in a defined manner from the normal line are used for the objective described herein. Within the framework of the invention, the definition and relationships of the terms partial dispersion and normal line correspond to those indicated in "Lexikon der Optik", Spektrum Akademischer Verlag, Heidelberg, Berlin, 2003.

The types of glass which are used are preferably those for which the deviations from the normal lines have been determined by publications of the manufacturer Schott Glas, Mainz, Germany, based on value pairs (catalog "Optical Glass", Schott Mainz, Version 1.5, 05/2003).

For the embodiment example of the objective according to the invention shown in FIG. 2: $\Delta P_{g.F2.1}$=0.03, $\Delta P_{g.F2.21}$=0.01, and $\Delta P_{g.F2.22}$=−0.01.

For the embodiment example of the objective according to FIG. 3: $\Delta P_{g.F2.}$=0.01, $\Delta P_{g.F2.21}$=0.03, and $\Delta P_{g.F2.22}$=−0.01.

The indices g and F designate wavelengths, where g corresponds to wavelength 435.8343 nm (blue mercury line) and F corresponds to wavelength 486.1327 nm (blue hydrogen line).

The objective 3 according to the invention offers advantages with respect to the correction of the chromatic aberration, field flattening and distortion as well as with respect to the demand for larger spaces for the post-magnification systems and for larger usable apertures in the object space.

While the foregoing description and drawings represent the present invention, it will be obvious to those skilled in the art that various changes may be made therein without departing from the true spirit and scope of the present invention.

REFERENCE NUMBERS 1 stereomicroscope
1.1, . . . , 1.5 lens
2 object
2.1, 2.21, 2.22 lens
3 objective
4.1, 4.2 light bundle
5.1, 5.2 magnification changer
6.1, 6.2 tube lens system
7.1, 7.2 eyepiece
$D_{AP}$ diameter of the exit pupil
$D_{EP}$ diameter of the entrance pupil
LG1, LG2 lens group
P off-axis point
ω angle

What is claimed is:

1. An objective for telescope-type stereomicroscopes with variable magnification, wherein the objective satisfies the conditions:

$$D_{AP} \geq 42 \text{ mm, and } \tan(\omega) \geq 0.16,$$

where $D_{AP}$ is the diameter of the exit pupil of the objective and ω is the field angle of the objective at the lowest possible magnification setting.

2. The objective according to claim 1 whose total focal length $f'_{objective}$ meets the condition:

$$40 \leq f'_{objective} \leq 160.$$

3. The objective according to claim 1, wherein the objective comprises two lens groups LG1 and LG2, and the relationship of the focal length $f'_{LG2}$ of the second lens group LG2 to the total focal length $f'_{objective}$ is expressed by:

$$0.1 - 1.8723/f'_{objective} \leq 1/f'_{LG2} \leq 0.2 - 1.8723/f'_{objective}.$$

4. The objective according to claim 3, wherein the two lens groups LG1 and LG2, respectively, have a positive refractive power as a whole, the first lens group LG1 comprises a plurality of lenses, at least two of which lenses are cemented together, and the second lens group LG2 comprises a lens with positive refractive power and a meniscus with negative refractive power with a convex curvature toward the object, wherein the first lens group LG1 lies closer to the object plane than the second lens group LG2.

5. The objective according to claim 4, wherein the first lens group LG1 comprises five lenses of which, considered from the object plane, the first lens (1.1), the third lens (1.3) and the fourth lens (1.4) have positive refractive power, the second lens (1.2) and the fifth lens (1.5) have negative refractive power, and the second lens (1.2) and the third lens (1.3) are cemented together, and the fourth lens (1.4) and the fifth lens (1.5) are cemented together.

6. The objective according to claim 4, wherein the first lens group LG1 comprises three lenses of which, considered from the object plane, the first lens (1.1) and the third lens (1.3) have positive refractive power, the second lens (1.2) has negative refractive power, and the first lens (1.1) and the second lens (1.2) are cemented together.

7. The objective according to claim 3, wherein the second lens group LG2 comprises three lenses (2.1, 2.21, 2.22) of which, considered from the object plane, the first lens (2.1) and the second lens (2.21) have positive refractive power, the third lens (2.22) has negative refractive power, and the second lens (2.21) is cemented to the third lens (2.22) to form a meniscus of negative refractive power with a convex curvature facing the object plane.

8. The objective according to claim 7, which satisfies the condition:

$$0.0003/f'_{objective} \leq \Delta P_{g.F2.1}/(v_{e2.1}*f'_{2.1}) + \Delta P_{g.F2.1}/(v_{e2.1}*f'_{2.21}) + \Delta P_{g.F2.22}/(v_{e2.22}*f'_{2.22}) \leq 0.0003/f'_{objective} + 0.001,$$

where $f'_{objective}$ is the total focal length of the objective 3, $f'_{2.1}$ is the focal length of lens (2.1), $f'_{2.21}$ is the focal length of lens (2.21), $f'_{2.22}$ is the focal length of lens (2.22), $v_{e2.1}$ is the Abbe number of the medium of lens (2.1), $v_{e2.21}$ is the Abbe number of the medium of lens (2.21), $v_{e2.22}$ is the Abbe number of the medium of lens (2.22), $\Delta P_{g.F2.1}$ is the deviation of the medium of lens (2.1) from the normal line, $\Delta P_{g.F2.21}$ is the deviation of the medium of lens (2.21) from the normal line, and $\Delta P_{g.F2.22}$ is the deviation of the medium of lens (2.22) from the normal line.

9. The objective according to claim 3, wherein lens group LG1 includes lenses 1.1, 1.2, 1.3, 1.4 and 1.5 and lens group LG2 includes lenses 2.1, 2.2 and 2.22, the objective having a total focus length $f'_{objective}$=50 mm and and exit pupil with diameter $D_{AP}$=47 mm and designed for magnification changers in which tan(ω)=0.18 is achieved at the lowest possible magnification, and the following constructional data indicate radii r in mm, thicknesses d in mm, distances a in mm, refractive indicies $n_e$ at a wavelength of 546.07 nm, and Abbe numbers $v_e$:

|     |      | r          | d        | a        | $n_e$    | $v_e$ |
| --- | ---- | ---------- | -------- | -------- | -------- | ----- |
|     |      | Object plane |        |          |          |       |
|     |      |            |          | 31.99693 |          |       |
| LG1 | 1.1  | −334.94300 | 13.10000 |          | 1.530190 | 76.58 |
|     |      | −39.24230  |          |          |          |       |
|     |      |            |          | 10.50000 |          |       |
|     | 1.2  | −515.78900 | 7.50000  |          | 1.677629 | 32.00 |
|     | 1.3  | 69.28260   | 17.25000 |          | 1.498450 | 81.13 |
|     |      | −81.16600  |          |          |          |       |
|     |      |            |          | 0.15000  |          |       |
|     | 1.4  | 131.46350  | 17.90000 |          | 1.498450 | 81.13 |

-continued

|     |      | r          | d        | a        | $n_e$    | $v_e$ |
| --- | ---- | ---------- | -------- | -------- | -------- | ----- |
|     | 1.5  | −51.95820  | 6.60000  |          | 1.616640 | 44.27 |
|     |      | −386.81700 |          |          |          |       |
|     |      |            |          | 0.15000  |          |       |
| LG2 | 2.1  | 73.91790   | 11.50000 |          | 1.498450 | 81.13 |
|     |      | −294.27300 |          |          |          |       |
|     |      |            |          | 0.92221  |          |       |
|     | 2.21 | 95.03140   | 8.90000  |          | 1.791789 | 25.89 |
|     | 2.22 | −258.51300 | 5.80000  |          | 1.658030 | 39.40.|
|     |      | 39.24230   |          |          |          |       |

10. The objective according to claim 3, wherein the first lens group has lenses 1.1, 1.2 and 1.3, the second group of lenses 2.1, 2.21 and 2.22, and the objective having a total focal length of $f'_{objective}$=100 mm and an exit pupil with diameter $D_{AP}$=47 mm and designed for magnification changers (5.1, 5.2) in which tan(ω)=0.18 is achieved at the lowest possible magnification, and the following constructional data indicate radii r in mm, thickness d in mm, distances a in mm, refractive indices $n_e$ at a wavelength of 546.07 nm, and Abbe numbers $v_e$:

|     |      | r          | d        | a        | $n_e$    | $v_e$ |
| --- | ---- | ---------- | -------- | -------- | -------- | ----- |
|     |      | Object plane |        |          |          |       |
|     |      |            |          | 61.80600 |          |       |
| LG1 | 1.1  | −258.51300 | 14.46000 |          | 1.487940 | 8.07  |
|     | 1.2  | −30.06750  | 4.00000  |          | 1.616640 | 44.27 |
|     |      | −88.22520  |          |          |          |       |
|     |      |            |          | 8.15800  |          |       |
|     | 1.3  | 344.71300  | 16.06000 |          | 1.530190 | 76.58 |
|     |      | −77.74390  |          |          |          |       |
|     |      |            |          | 0.40000  |          |       |
| LG2 | 2.1  | 244.08300  | 12.00000 |          | 1.668830 | 35.73 |
|     |      | −191.12700 |          |          |          |       |
|     |      |            |          | 0.05000  |          |       |
|     | 2.21 | 71.27670   | 12.00000 |          | 1.487940 | 84.07 |
|     | 2.22 | −107.46370 | 4.00000  |          | 1.616640 | 44.27.|
|     |      | 51.95820   |          |          |          |       |

\* \* \* \* \*